United States Patent
Hsiao

(10) Patent No.: US 7,198,064 B1
(45) Date of Patent: Apr. 3, 2007

(54) STANDING PIPE FAUCET ASSEMBLY

(76) Inventor: Hui-Fen Hsiao, 12F-1, No.401, Sec.1, Chung Shan Road, Changhua (TW)

( * ) Notice: Subject to any disclaimer, the term of this patent is extended or adjusted under 35 U.S.C. 154(b) by 0 days.

(21) Appl. No.: 11/357,082

(22) Filed: Feb. 21, 2006

(30) Foreign Application Priority Data

Sep. 14, 2005 (TW) .............................. 94215837 U

(51) Int. Cl.
*F16K 11/078* (2006.01)
(52) U.S. Cl. .................... 137/625.4; 137/801
(58) Field of Classification Search .......... 137/625.4, 137/801; 4/678
See application file for complete search history.

(56) References Cited

U.S. PATENT DOCUMENTS

| | | | | |
|---|---|---|---|---|
| 4,077,545 A | * | 3/1978 | Karls | 222/144.5 |
| 4,103,709 A | * | 8/1978 | Fischer | 137/615 |
| 5,127,427 A | * | 7/1992 | Kajpust et al. | 137/216 |
| 5,368,071 A | * | 11/1994 | Hsieh | 137/625.41 |
| 5,829,468 A | * | 11/1998 | Watanabe et al. | 137/15.08 |
| 6,073,972 A | * | 6/2000 | Rivera | 285/64 |
| 6,219,860 B1 | * | 4/2001 | Chang | 4/678 |
| 6,234,209 B1 | * | 5/2001 | Viegener | 137/801 |
| 6,311,729 B1 | * | 11/2001 | Cox et al. | 137/801 |
| 6,345,643 B1 | * | 2/2002 | Ko | 137/315.12 |
| 6,457,191 B2 | * | 10/2002 | Brandebusemeyer et al. | 4/678 |
| 6,619,320 B2 | * | 9/2003 | Parsons | 137/624.11 |
| 7,032,619 B2 | * | 4/2006 | Gaenzle | 137/615 |

* cited by examiner

*Primary Examiner*—John Fox
(74) *Attorney, Agent, or Firm*—Rabin & Berdo, P.C.

(57) ABSTRACT

A standing pipe faucet assembly manufactured by a process separately manufacturing a faucet body and a separate body to simplify the process and lower its manufacturing cost effectively includes a faucet body made of a hollow copper pillar, a blocking rim formed at the top of the faucet body for fixing a separate body, an outlet pipe connected to the faucet body, a chamber disposed at the separate body made of a solid copper pillar for installing a water mixing valve, and a lateral hole groove corresponding to the outlet pipe of the faucet body. After the separate body is installed to the faucet body, a water inlet is passed through the separate body to interconnect a water outlet of the lateral hole groove. The invention provides a simple and time-saving manufacture and reduces the material and manufacturing costs greatly, and thus is very useful for the industry.

2 Claims, 5 Drawing Sheets

STANDING PIPE FAUCET ASSEMBLY

BACKGROUND OF THE INVENTION

1. Field of the Invention

The present invention relates to a standing pipe faucet assembly, and more particularly to a faucet assembly manufactured by a process of separately making a faucet body and a separate body and assembling the faucet body and the separate body together to define the standing pipe faucet assembly, so as to replace the traditional structure having a faucet body made of a copper pillar by a turning manufacture process and a separate body, and thus effectively lowering the manufacturing time and cost.

2. Description of the Related Art

In the manufacture of a traditional standing pipe faucet assembly, a solid copper pillar is used for producing the structure of a chamber for accommodating a water mixing valve and a separate body for installing a cold water inlet pipe and a hot water inlet pipe to define the faucet body assembly, and a water outlet is drilled from a lateral side of the separate body to connect an outlet pipe, and finally the water mixing valve is installed in the faucet body while the top of the water mixing valve includes a water control handle for controlling the ratio of cold water and hot water as well as the discharge flow. The aforementioned process is employed to manufacture a complete standing pipe faucet assembly.

From the foregoing standing pipe faucet assembly, the faucet body manufactured by a solid copper pillar gives a better quality than those manufactured by the traditional sand casting process, but the international copper price remains very high, and thus increasing the overall material cost correspondingly. Furthermore, a large quantity of waste materials will be produced during the manufacturing and shaping processes of the copper pillar, and thus further wasting more materials and creating a burden and a waste to the overall material cost. Such standing pipe faucet does not comply with the cost-effective requirements of the industry and definitely requires improvements.

The structure of the chamber for installing a water mixing valve which is made of a solid copper pillar by a turning manufacture process and a separate body involves a relatively complicated manufacturing procedure and consumes more manufacturing time, which results in a low manufacturing efficiency and an increased overall manufacturing cost. Therefore, these problems require feasible solutions.

In the present manufacture of the standing pipe faucet, the sand casting method can lower its cost, but the quality is not as good, and there exists a lead content issue. As to the manufacturing method using solid copper pillars for the manufacture, the overall quality can be improved, but the consumption and waste of copper materials incur a high cost and consume much manufacturing time, and thus this method is not cost-effective. The inventor of the present invention conducted researches in hope of providing an improved structure for overcoming the foregoing shortcomings.

SUMMARY OF THE INVENTION

In view of the foregoing shortcomings of the prior art standing pipe faucet that adopts solid copper pillars to produce a faucet body by a turning manufacture process and incurs a high cost, the inventor of the present invention based on years of experience in the related industry to conduct researches and finally invented an improved standing pipe faucet assembly.

Therefore, it is a primary objective of the present invention to simplify the manufacturing process of a standing pipe faucet body so as to lower manufacturing time and greatly reduce material cost.

Another objective of the present invention is to maintain the overall manufacturing cost while lowering material and manufacturing costs.

To achieve the foregoing objectives, the structural design of the invention includes a faucet body made of a hollow copper pillar, a blocking rim stamped and formed at the top edge of the faucet body for fixing a separate body, an outlet pipe connected to a lateral side of the faucet body, a chamber disposed at the separate body made of a solid copper pillar for installing a water mixing valve, and a lateral hole groove corresponding to the outlet pipe of the faucet body. After the separate body is installed and fixed at the bottom of the faucet body, and then a water inlet is passed through the separate body to interconnect a water outlet of the lateral hole groove, so as to complete the manufacture of the faucet body of a standing pipe faucet. The invention not only provides a simple and time-saving manufacture, but also reduces the material and manufacturing costs greatly. The invention is definitely useful for the industry.

DETAILED DESCRIPTION OF THE PREFERRED EMBODIMENTS

The structural assembly, technical measures, and functions of the present invention will become apparent in the following detailed description of the preferred embodiments with reference to the accompanying drawings.

Figure 1:
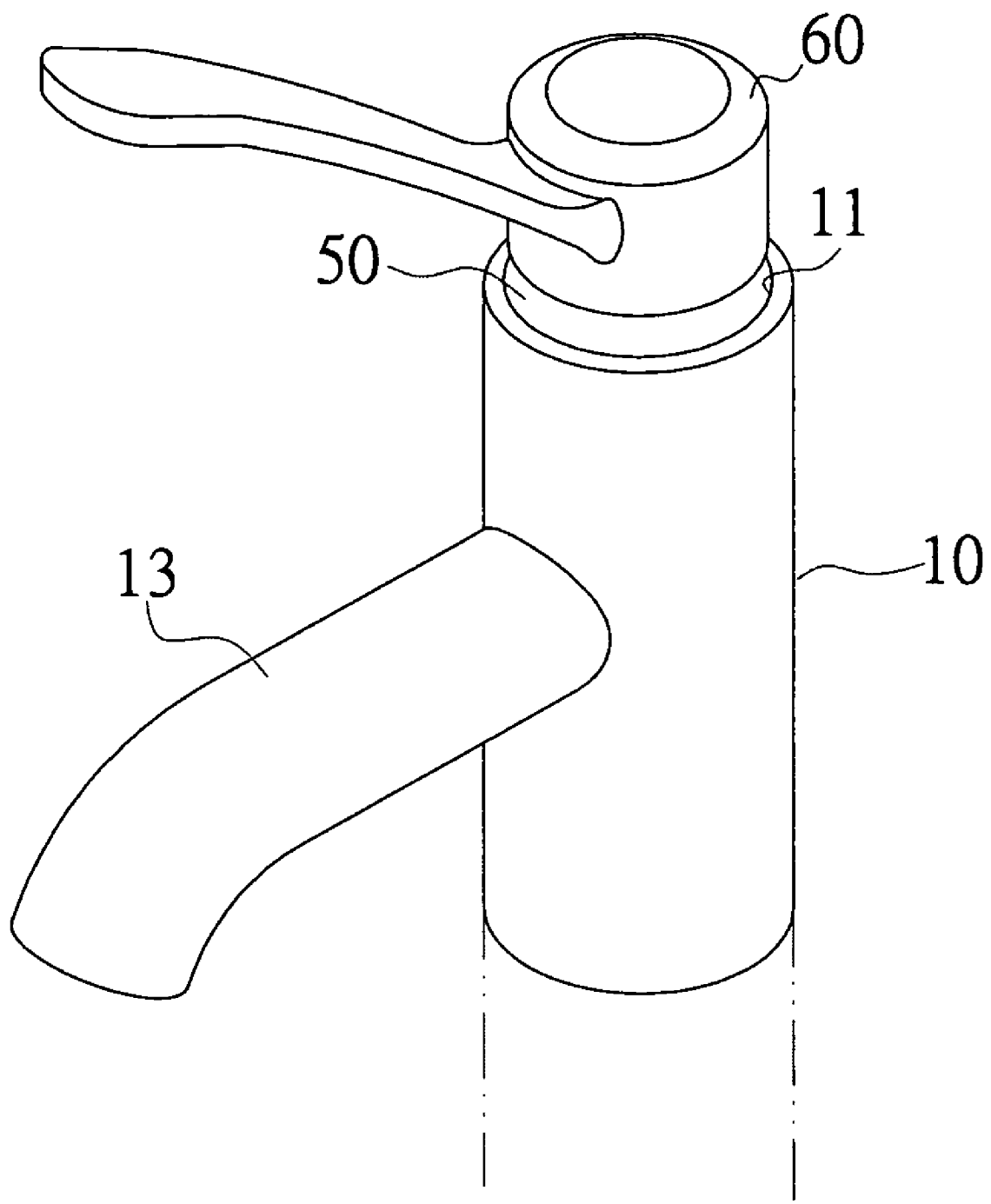
FIG. 1 is a schematic view of a structure according to a preferred embodiment of the present invention.
Figure 2:
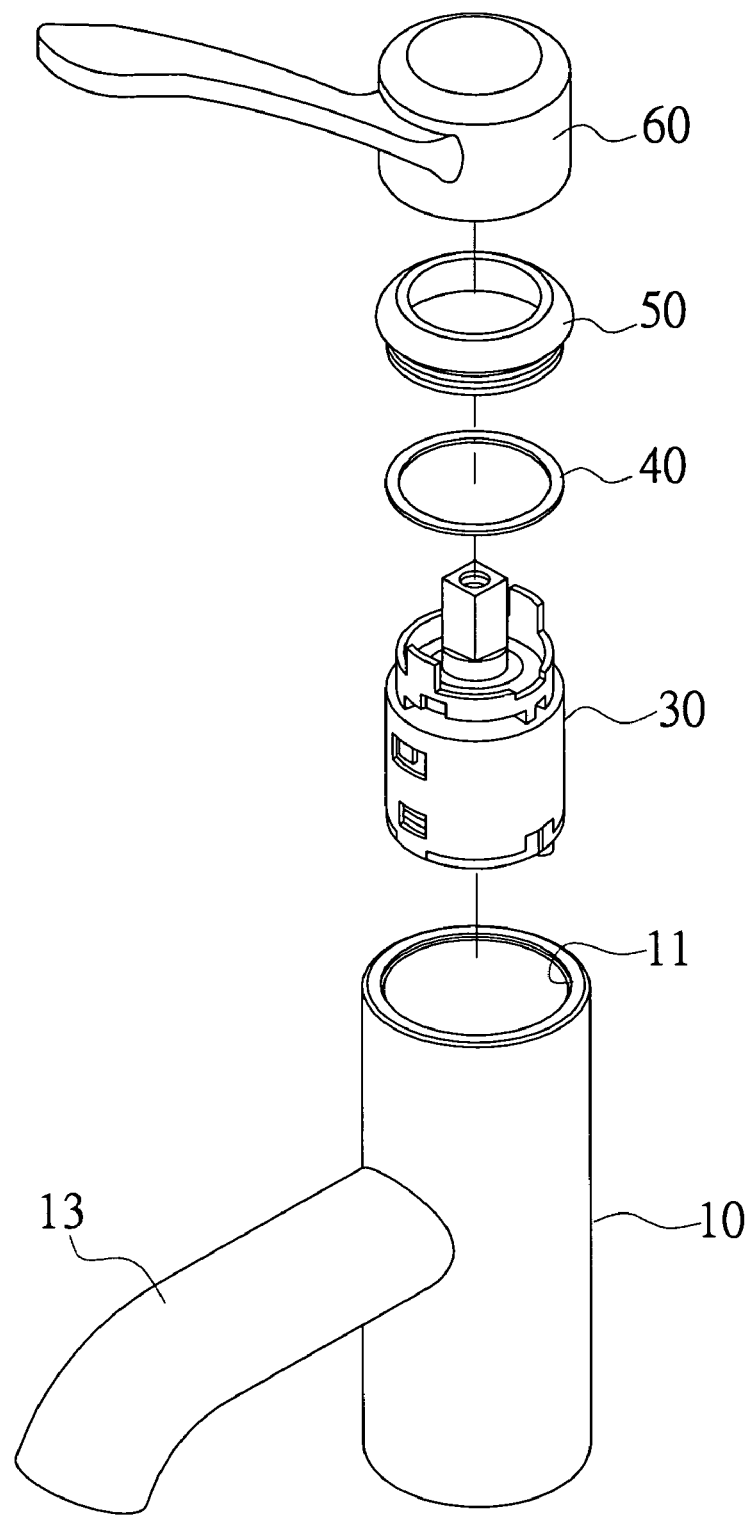
FIG. 2 is an exploded view of a structure according to a preferred embodiment of the present invention.
Figure 3:
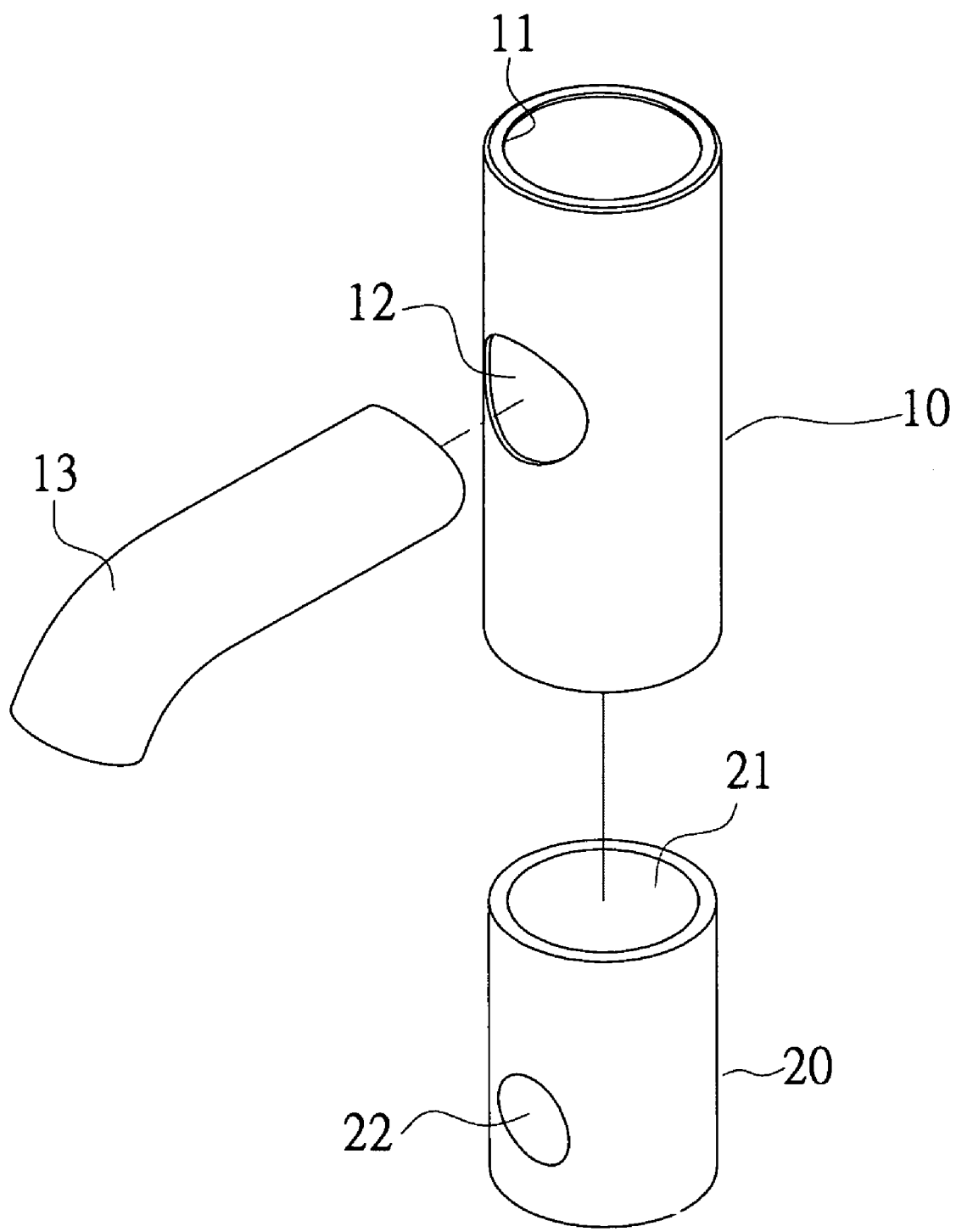
FIG. 3 is an exploded view of a faucet body and a separate body according to a preferred embodiment of the present invention.
Figure 4:
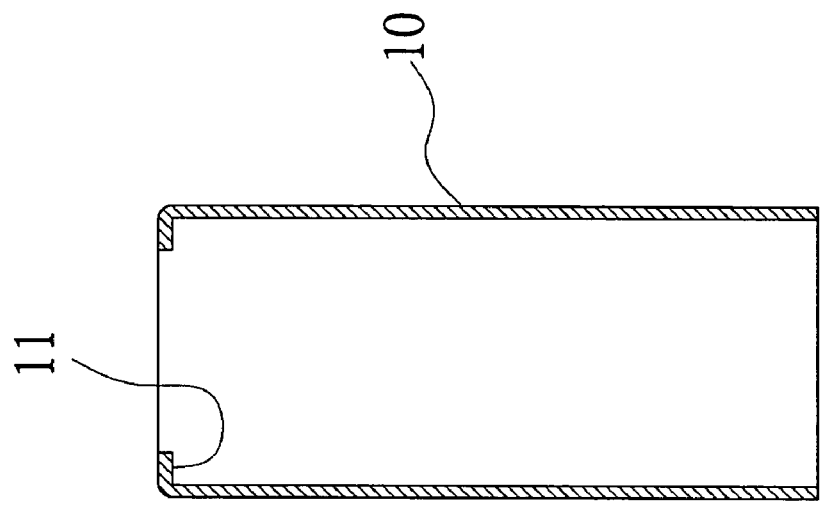
FIG. 4 is a schematic view of manufacturing a faucet body according to a preferred embodiment of the present invention.
Figure 5:
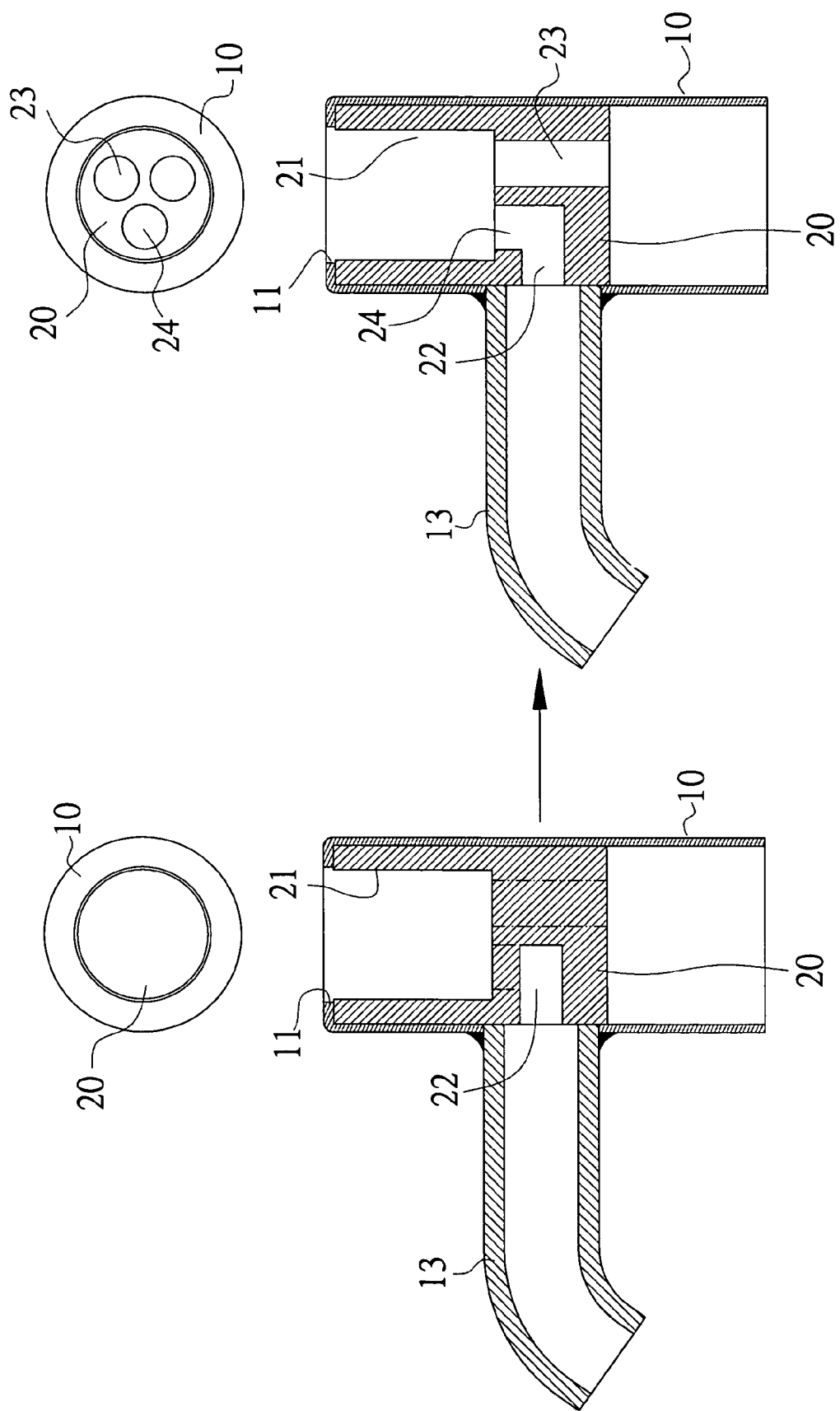
FIG. 5 is a schematic view of assembling a separate body according to a preferred embodiment of the present invention.

Referring to FIG. 1 for the schematic view of a structure of the invention, FIGS. 2 and 3 for the exploded views of a structure of the invention, and FIGS. 4 and 5 for schematic views of manufacturing the invention, the structural design of a preferred embodiment installs a faucet body 10 and a separate body 20; wherein:

The faucet body 10 is slightly shaped by directly using a copper pipe, and a blocking rim 11 is stamped and formed at the top edge of the faucet body 10, and a through hole 12 is disposed at an appropriate position for connecting an outlet pipe 13 having an appropriate configuration. In the faucet body 10 made of a hollow copper pipe, a separate body 20 is installed.

The separate body 20 is manufactured by using a solid copper pillar having a diameter equal to that of the foregoing faucet body 10, such that the separate body 20 can be plugged into the faucet body 10, and the separate body 20 at its upper section has a chamber 21 for installing a water mixing valve 30 and at its lower section has a lateral hole groove 22 disposed on a lateral side, so that after the separate body is installed at the bottom of the faucet body 10, the lateral hole groove 22 precisely corresponds to a through hole 12 disposed at a lateral side of the faucet body 10 and an outlet pipe 13. The water mixing valve 30 is installed onto the separate body 20 and passed through a water inlet 23 of the separate body 20 to interconnect a water outlet 24 of the lateral hole groove 22.

In the manufacture of the foregoing standing pipe faucet assembly, it only needs to separately manufacture the faucet body 10 and separate body 20 first, and then assemble them by a soldering process to complete the manufacture of a standing pipe faucet prototype. The separate body 20 is manufactured to have a water inlet 23 and a water outlet 24 disposed thereon, and the foregoing components constitute a complete standing pipe faucet. This manufacture procedure not only involves simple processes, but also significantly reduces the material cost. Unlike the integrally formed faucet body and separate body of a traditional faucet which is made of a solid copper pillar by a turning manufacture process, the structural design of the invention is very useful to the industry.

In the overall assembly, the faucet body 10 and the separate body 20 are integrally formed in advance, and then the corresponding water inlet 23 and water outlet 24 of the water mixing valve 30 are made, and thus it only needs to install the water mixing valve 30 in the chamber 21 disposed at the top of the pre-manufactured separate body 20 for the corresponding connecting relation, and a washer 40 is installed and a cap 50 is secured to fix the water mixing valve 30 into the chamber 21 of the separate body 20 of the faucet body 10. Finally, a water control handle 60 is installed to complete the assembling of the overall standing pipe faucet.

In the description above, a blocking rim 11 is stamped and formed at the top rim of a hollow copper pipe and a through hole 12 is formed at a predetermined position for connecting an outlet pipe 13 to produce a faucet body 10 of a standing pipe faucet assembly. The structure is simple and the manufacture is easy. Although the separate body 20 is made of a solid copper pillar by a turning manufacture process, the material cost remains very high due to the waste materials produced during the process of manufacturing the chamber 21 disposed at the top of the separate body 20 for installing the water mixing valve 30 and the lateral hole groove 22, and the water inlet 23 and water outlet 24. The waste of materials is much less than that of the prior art manufacturing process that uses a whole piece of solid copper pillar for the manufacture. The invention employs a design of separately manufacturing and assembling the faucet body 10 and the separate body 20, and thus the invention is cost-effective, the overall manufacturing process is simple and the invention is useful to the industry.

From the description above, the structural design of the standing pipe faucet changes the prior art integral structure of the faucet body and separate body made of solid copper pillars by a turning manufacture process to a separate assembling design of the faucet body and separate body without changing the overall functional architecture. The faucet body and separate body are manufactured and assembled separately, and thus not only simplifying the manufacturing process and reducing the manufacturing time, but also greatly lowering the material cost or avoiding the waste of materials. The invention can meet the cost-effective requirements of the industry.

In summation of the description above, the structural design of the invention innovatively employs a separate manufacture and assembling of the faucet body and separate body without changing the existing functional architecture of the standing pipe faucet, so that the manufacture of the faucet body can effectively reduce the manufacturing time and cost. Overall speaking, the invention is very useful to the industry and compliant with the cost-effective requirements, and further complies with the patent application requirements.

What is claimed is:

1. A standing pipe faucet assembly, comprising a faucet body, a separate body disposed inside said faucet body, an outlet pipe coupled to a side of said faucet body and disposed at a position corresponding to said separate body, a water outlet of said outlet pipe interconnected to a water outlet of said separate body, a water inlet of said separate body coupled to a cold water inlet pipe and a hot water inlet pipe, a chamber disposed in the top of said separate body for installing a water mixing valve and having a cap and a water control handle to define a complete standing pipe faucet assembly, characterized in that:

after said faucet body and said separate body are manufactured separately and then assembled and formed, said faucet body is manufactured by using a hollow copper pipe and stamping a blocking rim at the top of said copper pipe, such that said separate body can be fixed into the bottom of said faucet body easily.

2. The standing pipe faucet assembly of claim 1, wherein said separate body includes preliminarily manufactured chamber and lateral hole groove disposed at the top of said separate body for installing said water mixing valve and installed inside said faucet body, and then said water mixing valve is passed through said water inlet of said separate body to interconnect said water inlet of said lateral hole groove.

* * * * *